(12) United States Patent
Tsukihashi

(10) Patent No.: US 6,587,422 B1
(45) Date of Patent: Jul. 1, 2003

(54) DISK RECORDING DEVICE FOR OVERWRITING DATA ON A DEFINED RECORDING REGION

(75) Inventor: Akira Tsukihashi, Ohra-gun (JP)

(73) Assignee: Sanyo Electric Co., Ltd., Osaka (JP)

( * ) Notice: Subject to any disclaimer, the term of this patent is extended or adjusted under 35 U.S.C. 154(b) by 0 days.

(21) Appl. No.: 09/502,846

(22) Filed: Feb. 11, 2000

(30) Foreign Application Priority Data

Feb. 26, 1999 (JP) .......................................... 11-050775

(51) Int. Cl.⁷ .............................................. G11B 7/006
(52) U.S. Cl. ............................. 369/124.03; 369/47.3; 369/59.19; 369/32.01
(58) Field of Search .......................... 369/47.28, 47.3, 369/47.35, 53.34, 53.36, 59.19, 124.03, 32.01

(56) References Cited

U.S. PATENT DOCUMENTS 5,627,813 A * 5/1997 Miyashita ................... 369/116
5,644,554 A * 7/1997 Harada et al. ................ 369/13
5,717,674 A * 2/1998 Mori et al. .................. 369/103
5,883,865 A * 3/1999 Kondo et al. ................. 369/32
5,909,418 A * 6/1999 Noda et al. ................... 369/54
5,914,917 A * 6/1999 Bae ............................. 369/32
5,940,360 A * 8/1999 Choi ........................... 369/112
5,974,018 A * 10/1999 Takenaka ..................... 369/84
5,974,023 A * 10/1999 Miyauchi et al. ........ 369/275.3
6,104,692 A * 8/2000 Miyamoto et al. .......... 369/124
6,172,947 B1 * 1/2001 Senshu ........................ 369/32
6,181,655 B1 * 1/2001 Gushima ..................... 369/50

* cited by examiner

Primary Examiner—Doris H. To
Assistant Examiner—Gautam R. Patel
(74) Attorney, Agent, or Firm—Hogan & Hartson, LLP

(57) ABSTRACT

For an overwriting operation, recorded data is read from a disk, and a bit clock is reproduced from the read, recorded data in a clock reproduction circuit (7). Data processing in an encoder (14) is performed in synchronism with the reproduced bit clock. With the above, recording data is output from the encoder (14) in synchronism with the recorded data in the disk whereby recording data to write onto the disk for overwriting is synchronized with the recorded data. A defined recording region is thus precisely overwritten.

3 Claims, 2 Drawing Sheets

DISK RECORDING DEVICE FOR OVERWRITING DATA ON A DEFINED RECORDING REGION

BACKGROUND OF THE INVENTION

1. Field of the Invention

The present invention relates to an overwrite type disk recording device which allows overwriting of data already recorded on a disk, and in particular to a disk recording device for data overwriting while ensuring synchronism between recorded data and overwritten recording data.

2. Description of the Related Art

A CD-RW (compact disk rewritable) drive is a known type of CD (compact disk) disk recording device for data overwriting onto a disk.

In a CD-RW drive, a recording position is detected with reference to a recorded address, referred to as ATIP (Absolute Time in Pre-groove), which has been FM-modulated into a wobble of 22.05 kHz of a pre-groove formed on a blank disk.

In a typical CD-RW, recording data to be recorded onto a disk and a sub-code contained in recording data are synchronism with a synchronous signal of an ATIP.

Synchronism between a synchronous signal of an ATIP and that of a sub-code, however, may be impaired due to irregular disk turning and so on, even though a resultant displacement between the synchronous signals is tolerable within a predetermined range.

In particular, with a CD-RW drive capable of high speed writing, such displacement is likely to occur as acceleration or deceleration torque of a spindle motor are more likely to be shorted.

In recording a signal onto a disk while referring to an ATIP, such a displacement in synchronism between synchronous signals of an ATIP and of a sub-code would hinder establishment of synchronism between already recorded data and overwriting recording data.

In general, overwriting in a packet-writing method does not require synchronism established between recorded data and overwriting recording data. However, as all CD-ROM drives may not be able to employ the packet-write method, a track-at-once method or a session-at-once method may be preferred for data recording in view of compatibility with a CD-ROM drive.

In addition, a packet-writing method requires as many as seven link blocks to be formed for packet connection, and thus may waste disk storage capacity.

In view of the above, for data overwriting onto a disk, a method for data writing without leaving a trace of rewriting would be preferred if that would be possible, in view of compatibility with a CD-ROM and effective utilization of disk storage capacity. Thus, a disk recording device capable of data overwriting while leaving no trace, or only a subtle trace, of rewriting is desired.

For data rewriting while leaving no or a subtle trace, overwriting of recording data must have precise synchronism with the data then recorded on the disk. Otherwise, the newly recorded data might be written beyond a defined recording region, which may cause problems of partial damaging of recorded data beyond the region, or incomplete writing of a prescribed amount of overwriting recording data with partly cut-off toward the end thereof.

SUMMARY OF THE INVENTION

The present invention is directed to achieving precise writing of recording data to overwrite corresponding recorded data on a disk within a defined recording region while ensuring synchronism between the recording and recorded data.

According to the present invention, in data overwriting, recorded data is read from a disk, and a bit clock is reproduced from the read recorded data in a clock reproduction circuit so that data is processed in an encoder in synchronism with the reproduced bit clock. Recording data is accordingly output from the encoder in synchronism with the data recorded in the disk thereby synchronizing the overwriting recording data with the recorded data.

With this arrangement, in which recording data is output from an encoder in synchronism with the recorded data in a disk and written for overwriting the disk in synchronism with the recorded data, the overwriting data can be written precisely within a defined recording region. This can prevent problems such as partial damaging of the recorded data due to overwriting beyond a defined recording region, or incomplete writing of a prescribed amount of overwriting data.

Consequently, overwriting recording data can be written onto a disk while leaving no trace, or only a subtle trace, of rewriting on the disk in a boundary, and the overwriting data written on the disk can be reproduced successive to the preceding recorded data to help ensure compatibility with a typical CD-ROM drive.

Further, a bit clock can be readily reproduced even during an overwriting operation, when the bit clock is reproduced from the recorded data read by a preceding beam prior to a main beam.

Still further, a constant output can be maintained with the preceding beam even during a recording operation using a main beam when the preceding beam is emitted from a second light source, which is different from a light source emitting the main beam. This ensures reliable reproduction of a bit clock.

BRIEF DESCRIPTION OF THE DRAWINGS

The above and other objects, features, and advantages of the present invention will become further apparent from the following description of the preferred embodiment taken in conjunction with the accompanying drawings wherein.

DESCRIPTION OF THE PREFERRED EMBODIMENT

Figure 1:
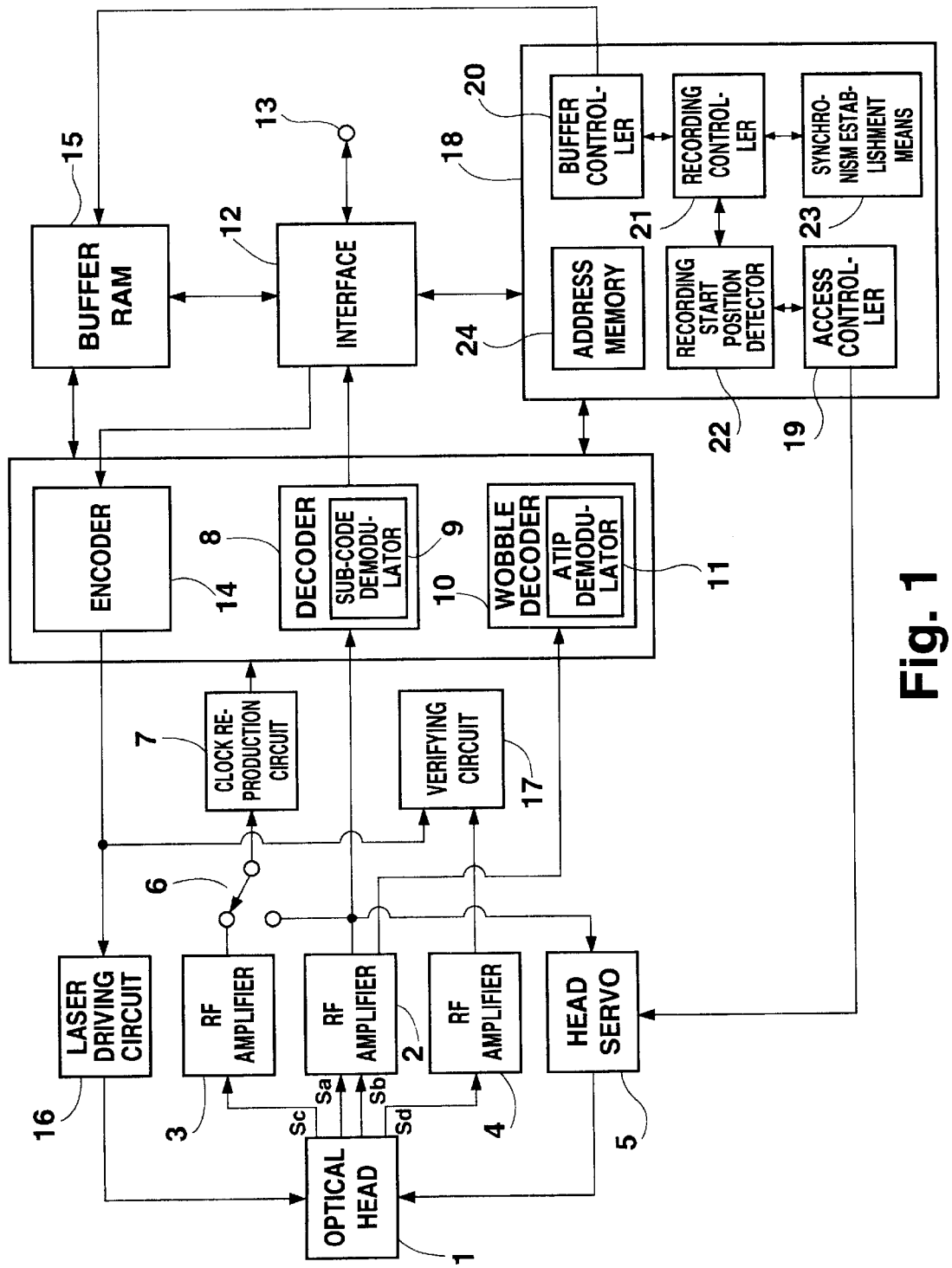
FIG. 1 is a block diagram showing a preferred embodiment of a disk recording device according to the present invention in the form of a CD-RW drive.

FIG. 1 is a block diagram showing a preferred embodiment of a disk recording device according to the present invention in the form of a CD-RW drive.

The drawing shows an optical head 1 for emitting a laser beam for tracing a signal track on a compact disk so that recording data is written on or recorded data is read from a disk.

The optical head 1 has two light sources, one forming a main beam and the other forming a beam to be split through diffraction into two, namely a preceding beam arranged before the main beam and a following beam arranged behind the main beam.

This arrangement advantageously prevents diffraction of the main beam, and allows the power of the preceding and following beams to be set independently of that of the main beam so as to be free from the influence of variances in the power of the main beam.

Figure 2:
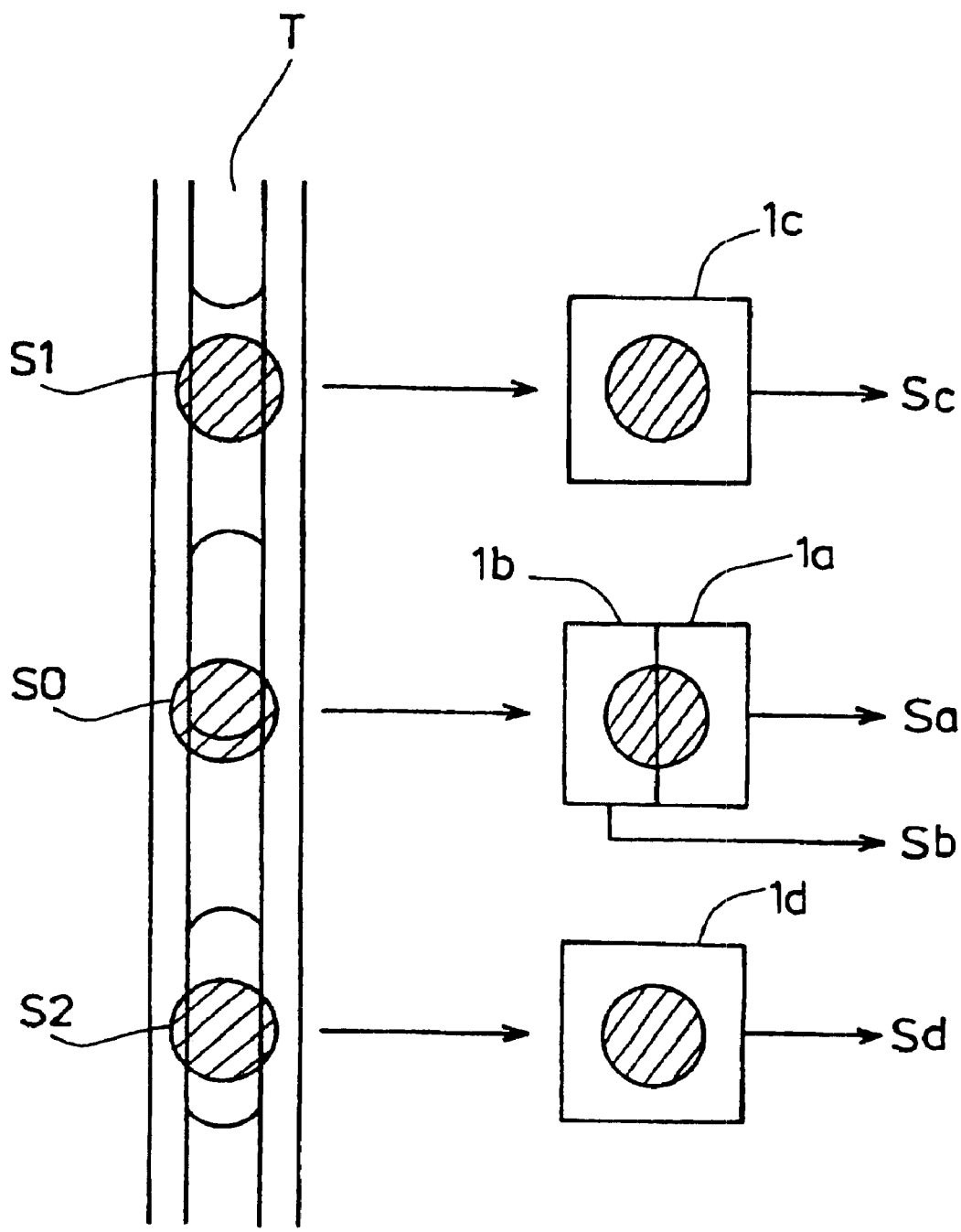
FIG. 2 is a diagram illustrating irradiation state on a signal track of a compact disk by respective light beams from an optical head, and light receiving elements of a light detector for receiving reflection beams of the respective light beams.

The main, preceding, and following beams irradiate separate portions of a same signal track T, respectively forming a light spot S0 (main beam), a light spot S1 (preceding beam), and a light spot S2 (following beam), as shown in FIG. 2. A reflection beam of the main beam, reflected from the disk, is received by a first light receiving element, which is divided into two light receiving regions 1a, 1b, of a light detector provided to the optical head 1. A reflection beam of the preceding beam, reflected from the disk, is received by a second light receiving element 1c of the light detector. A reflection beam of the following beam, reflected from the disk, is received by a third light receiving element 1d of the light detector.

A first RF amplifier 2 performs addition or subtraction operation, as well as amplification, using an RF signal (a radio frequency signal) of received light outputs Sa, Sb from the respective light receiving regions 1a, 1b of the first light receiving element, and binarizes an addition or subtraction signal obtained through addition or subtraction to produce a resultant signal which it outputs. A second RF amplifier 2 amplifies a received light output Sc from the second light receiving element 1c, binarizes the RF signal, and outputs the resulting data. The third RF amplifier 3 similarly processes a light Sd received from the third light receiving element 1d. A head servo circuit 5 performs focusing control, tracking control, and thread feed control based on feedback of an output of the optical head 1 via the first RF amplifier 2. Through focusing control, the laser beam is focused on a signal plane and, through tracking control, the laser beam tracks the signal track of the disk. Through thread feeding control, the optical head 1 is moved in the radial direction of the disk.

A selection switch 6 can be switched for a state, when reading, for selecting a binary data (EFM data) binarized from an addition signal obtained by the first RF amplifier 2, and also for a state, when recording, for selecting binary data (EFM data) binarized by the second RF amplifier 3. A clock reproduction circuit 7 reproduces a bit clock from the data selected by the selection switch 6. A decoder 8 demodulates data on an addition signal from the first RF amplifier 2 in synchronism with a bit clock reproduced by the clock reproduction circuit 7. A sub-code demodulation circuit 9 separates a sub-code from EFM data output from the first RF amplifier 2, and demodulates the separated sub-code.

A wobble decoder 10 demodulates data on a subtraction signal from the first RF amplifier 2 to thereby extract 22.05 kHz wobble components from a pre-groove signal from the disk to generate components necessary for disk turning control. The wobble decoder 10 includes an ATIP demodulation circuit 11 for demodulating wobble components to restore an ATIP (absolute time in pre-groove).

An interface 12 controls data transmission with respect to a host device, such as a personal computer, which is externally connected via a connection terminal 13. An encoder 14 modulates data received via the interface 12 into recording data to be recorded onto a disk. A buffer RAM 15 is used for caching data received via the interface 12 and used when the cached data is modulated in the encoder 14 into recording data to be recorded onto a disk. Furthermore, the buffer RAM 15 is used for caching data read from the disk, and used when the data is demodulated in the decoder 8.

The encoder 14 has a CD-ROM modulator for modulation based on CD-ROM standard, and a CD modulator for modulation based on CD-DA standard. The CD-ROM modulator imparts synchronization (sync), header, EDC (error detection code), and ECC (error correction code) to receiving data, EDC being an error detection code for CD-ROM data, and ECC being an error correction code for CD-ROM data. The CD modulator performs CIRC (cross interleaved reed-solomon code) processing and imparts a sub-code to data output from the CD-ROM modulator, CIRC being an error correction code in a CD method. The CD modulator also performs EFM (eight to fourteen modulation) and imparts a synchronous signal.

A laser driving circuit 16 drives a laser source of the optical head 1 to record onto a disk based on recording data in the form of EFM data from the encoder 14. A verifying circuit 17 compares recording data from the encoder 14 and EFM data from the third RF amplifier 4 through time adjustment for time conformity to thereby verify recorded data written on a disk.

A system control circuit 18 is responsible for system control in connection with data recording onto and reproduction from a disk, and comprises an access control means 19, a buffer control means 20, a recording control means 21, a recording start position detection means 22, and a synchronism establishment means 23. The access control means 19 controls access to the disk with selective reference to a sub-code address expressed in the form of absolute time information contained in a sub-code (sub-Q-code), which is demodulated in the sub-code demodulation circuit 9, and an ATIP address expressed in the form of absolute time information contained in an ATIP, which is demodulated in the ATIP demodulation circuit 11. The buffer control means 20 controls data writing and reading with respect to the buffer RAM 15. The recording control means 21 controls data recording onto a disk according to the amount of data stored in the buffer RAM 15, which is controlled by the buffer control means 20. The recording start position detection means 22 detects a recording start position at which the recording control means 21 starts data recording. The synchronism establishment means 23 synchronizes recording data to be newly recorded onto a disk with recorded data existing on the disk, using a synchronous signal of a sub-code extracted by the decoder 4 and sub-Q-data demodulated by the sub-code demodulation circuit 9.

The thus constructed disk recording device executes a recording operation upon receipt, via the interface 12, of data with a request for being recorded onto a disk.

When a not-recorded region on a disk is designated as a recording region and a data recording operation thereonto is started, a system clock of the recording circuit is used as a reference clock with crystal oscillation accuracy, and data processing in the encoder 14 is performed in synchronism with a reference clock.

The optical head 1 is controlled so as to read a pre-groove signal from a disk, using a main beam, a laser output for disk reading. The read pre-groove signal is supplied to the first RF amplifier 2 for waveform shaping, and then to the wobble decoder 10 for extraction of wobble components. The extracted wobble components are demodulated into an ATIP in the ATIP demodulation circuit 11.

When an external device sends data with a recording request via a connected connection terminal 13, the data is received by the interface 12 and then written into the buffer RAM 15.

Data is received by the interface 12 in block units. When a predetermined number of data blocks have been written into the buffer RAM 15, that number being a recording unit set in advance, the data is together modulated in the encoder 14 into recording data in the form suitable for data recording.

Meanwhile, when the main beam of the optical head 1 tracing the disk reaches a point at which data writing is to start, the encoder 14 begins sequential output of recording data in the EFM frame unit. Moreover, address data on the address corresponding to the output recording data is sequentially updated and stored in the address memory 24 in the system control circuit 18.

Based on the recording data from the encoder 14, the laser driving circuit 16 drives the laser source of the optical head 1 to thereby write recording data onto the disk.

Next, operation for overwriting a disk with recording data will be described.

When data with an overwrite request is received from a host device via the interface 12, the recording start position detection means 22 initiates detection of a recording start position on a disk. An overwrite request from a host device includes a designation of a recording region to be overwritten, the designation containing data on a start address of the recording region, data length of overwriting data, and the like.

Upon initiation of detection by the recording start position detection means 22, the access control means 19 accesses an address on a disk which precedes by a predetermined amount the start address of the recording region designated in the overwrite request with reference to an ATIP, which is demodulated in the ATIP demodulation circuit 11.

When access is completed, the optical head 1 begins tracing the disk to read a pit signal from the disk using the main beam. Accordingly, EFM data is obtained from the first RF amplifier 2.

The EFM data from the first RF amplifier 2 is supplied to the decoder 8. The decoder then extracts a synchronous signal of a sub-code from the EFM data, and the sub-code demodulation circuit 9 demodulates the EFM data into a sub-Q-code.

The resultant sub-Q-code is used for detection of a recording start position by the recording start position detection means 22. That is, detection of a recording start position in sub-code frame units (a collection of 98 units of EFM frames) is made through access to sub-Q-data.

The extracted synchronous signal of a sub-code is used for establishment of synchronism by the synchronism establishment means 23 to synchronize recording of data to be newly recorded onto a disk with recorded data already stored on that disk.

After determination of a recording start position in a sub-code frame unit, a recording start position in an EFM frame unit is then determined by counting a channel bit using a synchronous signal as a reference. In this manner, a recording start position is determined.

During a process to determine a recording start position in a recording region for overwriting as described above, data with a recording request is received via the interface 12. When a predetermined number of blocks of such data has been written into the buffer RAM 15, the encoder 14 resumes modulation processing to thereby resume preparation of recording data.

When a recording start position is determined, the encoder 14 outputs recording data, which triggers a writing operation using the recording data to overwrite the disk.

For overwriting, the selection switch 6 is switched as shown by the solid line in FIG. 1, in which state clock reproduction circuit 7 reproduces a bit clock from EFM data from the second RF amplifier 3.

The second RF amplifier 3 then receives a received light output Sc from the second light receiving region 1C, which receives reflection light of the preceding beam from the optical head 1, and an EFM signal corresponding to a pit signal read by the preceding beam is output from the second RF amplifier 3.

As the preceding beam is emitted from a light source different from that of the main beam, which is arranged to alternatingly output a recording power and an erasing power during data recording onto a disk, constant reproduction power of the preceding beam can be maintained during a recording operation. This enables reliable reproduction of a bit clock by the clock reproduction circuit 7.

Specifically, even during a process of overwriting a disk with recording data using a main beam, the clock reproduction circuit 7 can reproduce a bit clock based on the recorded data written in the disk at a point immediately before the very point where recording data is being written.

The thus reproduced bit clock is used as an operation clock for the decoder 8 and the encoder 14 so that demodulation and modulation operations are carried out by the decoder 8 and the encoder 14, respectively, in synchronism with the bit clock.

Therefore, the encoder 14 outputs recording data in synchronism with the bit clock, so that recording data is written onto the disk in synchronism with the recorded data. This enables precise overwriting in a defined recording region, and, as a result, recording data can be written onto the disk while leaving no trace, or only a very subtle trace, of rewriting in a boundary from the recorded data. Consequently, the recorded data in the overwritten recording region can be reproduced successive to the preceding recorded data, which helps to establish compatibility with a typical CD-ROM drive.

Here, during a recording operation using recording data onto disk, an EFM signal from the third RF amplifier 4 is supplied to the verifying circuit 17. The verifying circuit 17 delays the recording data (EFM data) from the encoder 14 for time conformity, and compares the recording data with an EFM signal from the third RF amplifier 4.

As the third RF amplifier 4 then receives a received light output Sd from the third light receiving region id, which receives a reflection light of the following beam of the optical head 1, an EFM signal corresponding to a pit signal read by the following beam is output from the third RF amplifier 4. Therefore, the third RF amplifier 4 outputs an EFM signal corresponding to the recording data just recorded onto the disk.

As described above, recording data being just recorded onto the disk is verified in the verifying circuit 17.

It should be noted that, as the main beam is arranged to alternatingly output a recording power and an erasing power during a writing operation onto a disk using recording data, reproduction of a bit clock directly from a received light of the main beam would be difficult. However, reproduction of a bit clock based on a difference obtained by subtracting a varying amount of the main beam output from the received light output of the main beam would be possible. In this case, the preceding beam is unnecessary, and the number of light sources of the optical head 1 can be reduced to one when the following beam is formed through diffraction of the main beam.

What is claimed is:

1. A disk recording device capable of data writing onto a disk for overwriting, comprising:

a clock reproduction circuit for reproducing a bit from recorded data read from the disk;

an encoder for data processing to modulate input data into recording data suitable for recording onto the disk; and an optical head for reading recorded data from the disk, and for writing the recording data supplied from the encoder;

wherein, for an overwriting operation, the optical head reads the recorded data from the disk, the clock reproduction circuits reproduces a bit clock from the recorded data read by the optical head, the encoder performs data processing in synchronism with the bit clock reproduced by the clock reproduction circuit to thereby prepare recording data which is in synchronism with the recorded data, and the optical head writes the recording data onto the disk based on an output from the encoder, wherein the optical head generates a main beam for recording onto the disk, and a preceding beam for tracing a signal track on the disk prior to the main beam, and detects a reflection beam of the preceding beam, reflected from the disk, and the clock reproduction circuit reproduces the bit clock based on a result of detection of the reflection beam of the preceding beam; and wherein the optical head includes a first light source for generating the main beam and a second light source which is different from the first light source, for generating the preceding beam.

2. A device according to claim 1, wherein an output from the second light source is controlled independently of an output from the first light source.

3. A disk recording device capable of data writing onto a disk for overwriting, comprising:

a clock reproduction circuit for reproducing a bit clock from recorded data read from the disk;

an encoder for data processing to modulate input data into recording data suitable for recording onto the disk; and an optical head for reading recorded data from the disk, and for writing the recording data supplied from the encoder;

wherein, for an overwriting operation, the optical head reads the recorded data from the disk, the clock reproduction circuits reproduces a bit clock from the recorded data read by the optical head, the encoder performs data processing in synchronism with the bit clock reproduced by the clock reproduction circuit to thereby prepare recording data which is in synchronism with the recorded data, and the optical head writes the recording data onto the disk based on an output from the encoder, wherein the optical head generates a main beam for recording onto the disk, and a preceding beam for tracing a signal track on the disk prior to the main beam, and detects a reflection beam of the preceding beam, reflected from the disk, and the clock reproduction circuit reproduces the bit clock based on a result of detection of the reflection beam of the preceding beam, wherein the optical head generates a following beam for tracing the signal track on the disk subsequently to the main beam to detect a reflection beam of the following beam, reflected from the disk, and the disk recording device includes a verifying circuit for verifying data recorded on the disk by comparing a result of detection of the reflection beam of the following beam and the recording data recorded onto the disk by the main beam, and wherein the optical head includes a first light source and a second light source which is different from the first light source, wherein the main beam is emitted from the first light source, and the preceding beam and the following beam are formed by splitting a beam emitted by the second light source.

* * * * *